(12) United States Patent
Sherwin et al.

(10) Patent No.: US 12,033,185 B2
(45) Date of Patent: *Jul. 9, 2024

(54) METHODS AND SYSTEMS FOR MAPPING ADVERTISING INVENTORY

(71) Applicant: Comcast Cable Communications, LLC, Philadelphia, PA (US)

(72) Inventors: Jeffrey Sherwin, Scarsdale, NY (US); Jonathan Heller, New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,662

(22) Filed: Jul. 14, 2022

(65) Prior Publication Data

US 2023/0005017 A1 Jan. 5, 2023

Related U.S. Application Data

(63) Continuation of application No. 15/622,918, filed on Jun. 14, 2017, now Pat. No. 11,430,007.

(51) Int. Cl.
*G06Q 30/00* (2023.01)
*G06Q 30/0251* (2023.01)

(52) U.S. Cl.
CPC ..... *G06Q 30/0255* (2013.01); *G06Q 30/0254* (2013.01); *G06Q 30/0261* (2013.01)

(58) Field of Classification Search
None
See application file for complete search history.

(56) References Cited

U.S. PATENT DOCUMENTS

| | | | |
|---|---|---|---|
| 7,089,298 B2 | 8/2006 | Nyman et al. | |
| 7,340,438 B2 | 3/2008 | Nordman et al. | |
| 8,165,568 B2 | 4/2012 | Zellner et al. | |
| 10,055,757 B1* | 8/2018 | Burcham | G06Q 30/0251 |
| 2003/0046159 A1 | 3/2003 | Ebrahimi et al. | |
| 2004/0098625 A1 | 5/2004 | Lagadec et al. | |
| 2004/0103212 A1 | 5/2004 | Takeuchi et al. | |
| 2011/0107362 A1 | 5/2011 | Reilly et al. | |
| 2015/0088663 A1 | 3/2015 | Schechter et al. | |
| 2016/0148255 A1 | 5/2016 | Shariat et al. | |

(Continued)

OTHER PUBLICATIONS

Margaret Rouse, Identifier for Advertisers, Nov. 7, 2012, Techopedia (Year: 2012).*

(Continued)

*Primary Examiner* — Naresh Vig
(74) *Attorney, Agent, or Firm* — BakerHostetler

(57) ABSTRACT

Provided are methods and systems for, in one aspect, managing content delivered to one or more devices. Methods may comprise receiving a first identifier associated with a user of content. The content may comprise one or more advertisement or placement opportunities. A second identifier may be determined based at least on the first identifier. The second identifier may be a perishable identifier configured to expire based on an event. The second identifier may be transmitted to an entity associated with an advertisement inventory, wherein the second identifier facilitates the targeted placement of one or more advertisements from the advertisement inventory without exposing the first identifier to the entity.

21 Claims, 10 Drawing Sheets

(56) References Cited

U.S. PATENT DOCUMENTS

2016/0165390 A1    6/2016    Hartzell et al.
2017/0103392 A1*    4/2017    Moore ............... G06Q 30/0222

OTHER PUBLICATIONS

15 Year Old Entrepreneur Launches NO-SPAM Email Service, Dec. 10, 1999, Business Wire (Year: 1999).

How Does a VPN Work, Apr. 12, 2016, www.octanevpn.com, printed through www.archive.org, (Year: 2016).

Tomasz Bujlow, Web Tracking: Mechanism, Implications, and Defenses, Jul. 28, 2015, IEEE (Year: 2015).

Upstream (networking), Mar. 11, 2016, Wikipedia, printed through www.archive.org (Year: 2016).

What is VPN Service, Jun. 3, 2017, What Is My IP Address, printed through www.archive.org (Year: 2017).

* cited by examiner

FIG. 10 is a block diagram of an exemplary computing system.

METHODS AND SYSTEMS FOR MAPPING ADVERTISING INVENTORY

CROSS REFERENCE TO RELATED APPLICATIONS

This application is a continuation of U.S. patent application Ser. No. 15/622,918, filed Jun. 14, 2017, now U.S. Pat. No. 11,430,007, which is hereby incorporated by reference in its entirety.

BACKGROUND

A multiple system/service operator (MSO) may sell advertisement space directed to local or regional businesses, and can target or swap out national advertisements for local or regional market ads. In addition, MSOs own or can locate individual subscriber set top boxes, and can target local advertisements for all subscribers in a region, town, or down to a specific subscriber. Advertisements targeted to particular intended audiences are made possible when the MSO gains access to personal identifiable information (PII) about their subscribers, made available within set top boxes or via the Internet. PII may include the location of a set top box including its hardware MAC address, marketing information, such as which programs and commercials have been viewed, and direct subscriber personal information such as a subscriber's name, home address, subscription or order history, and credit score. However, MSO may not want to expose PII outside the system operated by the MSO. Therefore, improvements in managing advertising inventory are needed.

SUMMARY

Provided are methods and systems for controlling content delivered to one or more devices. Methods can comprise receiving or accessing a first identifier associated with a user consuming content. The content may comprise one or more advertisement events. A second identifier may be created or determined based at least on the first identifier. The second identifier may be a perishable identifier configured to expire based on an event such as a time period. The second identifier (e.g., perishable identifier) may be transmitted to an entity associated with content inventory such as an advertisement inventory. As such, the second identifier may facilitate targeted placement of one or more content assets (e.g., advertisements) from the content inventory without exposing the first identifier to the entity.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
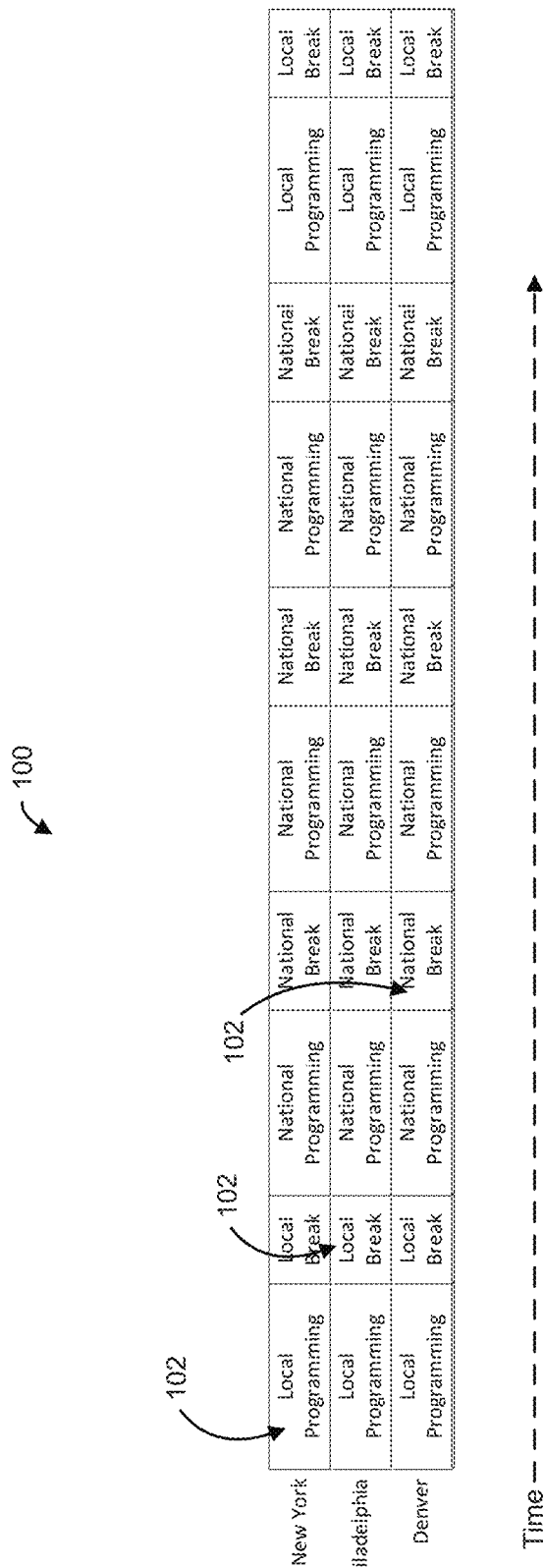
FIG. 1 is a representation of exemplary content timelines.

A network system such as a system operated by a multiple system/service operator (MSO) may generate a placement opportunity such as an advertisement (ad) inventory event, which may be or become available during consumption of an item of content. The ad inventory event may indicate a position or break in the content item or asset where additional content such as an advertisement may be provided as part of the consumption of the content item. The advertisement inventory event may be filled with an advertisement or other content from one or more sources. The content item may be or comprise audio, video, text or other information. The advertisement may be intended for general audiences, targeted audiences, or both. A targeted advertisement may be based on personal identifiable information (PII) about users/subscribers which may comprise location of a device including its hardware MAC address, marketing information, such as which programs and commercials have been viewed, and direct user/subscriber personal information such as a name, home address, subscription or order history, and credit score.

However, the MSO, or another entity filling ad opportunities, may not want to expose PII outside a closed or trusted system operated by the MSO due to at least user privacy or other concerns. For example, the PII may facilitate unwanted tracking of viewing behavior of particular users/clients by entities outside the system operated by the MSO. For example, if a national network obtains information about subscribers in the New York metropolitan area, then the national network may begin selling ads for a premium to companies that are only in the New York metropolitan area, which a local advertiser may not be able to afford. However, an entity may satisfy different parties, both legally and commercially, by purging certain PII that identifies an individual subscriber or other local or regional market information, and may still provide certain statistical demographic information, e.g., the number of people who are male or have a certain income level.

Additionally or alternatively, in managing the delivery of the content item, a network system may leverage a user identifier that maps to a household, user, or segment of audience consuming the content item. The system and methods of the present disclosure may generate and/or maintain a mapping of a persistent user identifier and a perishable second identifier (e.g., session identifier). The second or secondary identifier may persist at the session level or some other configurable duration of time. As an example, when an advertisement rights management platform routes advertisement decision rights to an external entity (e.g., upstream entity) from the network system owner/operator, the advertisement rights management platform may pass along the perishable secondary identifier to that upstream entity while passing both the perishable secondary identifier and the primary persistent user identifier to the instance of the rights management platform of the network system owner.

The use of two identifiers in this manner enables the upstream entity that has been granted the rights to see and use the perishable secondary identifier to target advertising to attributes associated with the persistent user identifier without ever having possession of that persistent user identifier nor being able to reverse engineer or impute those targeting attributes to a proxy persistent user identifier. As such, the persistent user identifier is maintained by the system operator and is not exposed to entities interacting with the content items or advertisement inventory events.

Traditionally, programming of broadcast and cable television and radio, including content (i.e., the video or audio program) and (the placement of) advertisements in a video or audio signal stream, has followed a linear model. Programming may be linear in the sense that a program begins and is streamed and in progress when a user chooses to view entertainment content. FIG. 1 illustrates a conventional linear or video-on-demand (VOD) model for advertisement placement. Content 100, when processed as a digital data stream over a cable network, may be divided into a number of time intervals. The time intervals 102 include time reserved for a viewed program (content), such as a television program. The intervals 102 may represent sections of time reserved for advertisements or "avails." These "avails" may be viewed as advertisement placement opportunities. As used herein, a "placement opportunity" was traditional called an avail and is sometimes referred to as a slot (spots into slots). A placement opportunity (PO) is a construct that represents an opportunity to insert an advertisement or entertainment content, and defines the rules for that opportunity, such as its duration, interactivity, ownership, and technical constraints.

In linear over-the-air or traditional cable TV broadcasting, advertisement time may occur before, during, or after the intervals 102. The list of intervals 102 (e.g., programs and breaks) may be received by a service provider in a schedule, and may provide additional information as to which entity, e.g., a network, an operator, or other entity, owns each of the avails. A traffic and billing system then reads the schedule and identifies which network, operator, or other entity has the right to place an advertisement during a particular avail of a given pod during a given break. Existing cable systems provide static sales—e.g., a 30 second spot in a particular geographic market which may be inserted into one or more of the intervals 102.

In non-linear systems, such as Video-on-Demand (VOD), the intervals 102 may take on new meanings. The interval 102 may be a pre-roll, i.e., the space in a video that occurs immediately after a user clicks to start a VOD video. The interval 102 may be a post-roll, i.e., the space after all of the VOD video segments have finished playing. The intervals 102 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). One or more of the intervals 102 in such play lists may be ripe for the insertion of advertisements, i.e., advertisement placement opportunities.

As used herein, the term "binding" refers to an identification of signals and content within a placement opportunity (PO). PO's are frequently created for broad amounts of content that are not yet published (i.e., any show on TNT network in the evening). When the show airs and a signal is detected, the signal is bound to the relevant PO's for that show.

As used herein, the term "impression" refers to a showing of an ad to a single viewer. For example, if a 30 second spot is placed in 50,000 video-on-demand (VOD) streams and it is known that 30,000 of the streams actually played the ad, then 30,000 impressions of that ad have been generated.

As used herein, a "status notification" may be, but is not limited to, an HTTP call from a VOD server with a unique ID that was created when a decision was delivered.

As used herein, the term "break" refers to all of the space in a stream between entertainment content. For example, a group of 4 consecutive 30 second spots between 2 segments of a television show may be considered as a single break.

In the traditional model for the placement of ads in television programming, avails are specified by a simple combination of channel and time and decided weeks ahead of broadcast. However, new cable content delivery systems permit advertising spots of varying duration, permit different levels of interactivity (e.g., polling or linking) through the use of buttons on a remote control, may be defined by geography, etc. In a world where TV viewing is becoming increasingly non-linear (e.g., video-on-demand (VOD), networked-based personal video recorders (PVR), interactive programs), a key goal of advertisement opportunity placement systems is to determine how to define placement opportunities that are non-deterministic and manifest dynamically. Advanced advertising needs to accommodate advertisement placement opportunities that are invoked by user events, which may include anything from playback of a VOD title to pausing one's DVR. As the scope of potential placement opportunities expands accordingly, it becomes necessary to precisely define those placement opportunities with attributes representing relevant business rules. These may be used to specify such things as inventory splits, quantity, duration, and position of ad breaks (pre-roll, mid-roll, post-roll); placement of pause ads and overlays; and levels and types of interactivity.

On the Internet, a content publisher and an advertiser may be isolated from one another, with an advertising network acting as an intermediary. On TV, the advertising network was formerly the national network, the cable network, or the cable operator, that had fixed avails. However, emerging advanced advertising standards for dynamic television provide an opportunity for content providers to derive value from a cable operator's ad placement infrastructure by creating new and more flexible advertising inventory (i.e., Potential Viewership*Placement Opportunities=Advertising Inventory). This new business model imposes unique technical challenges: unlike the Internet, where browsers access/display content and then are separately "referred" to a shared ad network, the cable television infrastructure selects and assembles both the advertisement and the content together in the network and delivers the combined result to customers' set top boxes. For this to work, cable television advanced advertising networks may need to at least partially operate within the infrastructure of an MSO. To achieve optimal addressability and user experience and achieve bandwidth efficiencies, advertising service elements and digital delivery components need to be located close to the edge of a network, i.e., at or near set top boxes. Decisions need to be made based upon relevant context (infrastructure, platform, content, geography, demographics, etc), which are applicable to non advertisements as well (e.g., suggested content). By making placement decisions and insertions at the time of a user request—or even at the appropriate times during content playout—fully dynamic ad placement may be achieved.

Certain embodiments of the present invention are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as ad rotation groups (rotation groups refer to placement opportunities that run in rotation so that the same add is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces.

The SCTE-130 standard defines a set of logical services comprising an advanced advertising system. Each logical service may itself be a complex system. In an embodiment, one or more of the following logical services may be used by or interact with certain embodiments of the present invention.

An Ad Management Service (ADM) may be configured to define messages in support of ad insertion activities. The primary consumer of these messages is an Ad Decision Service (ADS). The message interfaces exposed by an ADM permit both pre-configured ad decisions as well as real-time fulfillment models. An ADM implementation may incorporate some simple ad selection rules (e.g., ad rotations) but more complex ad decisions are the responsibility of an ADS.

An Ad Decision Service (ADS) may be configured to determine how advertising content is combined with non-advertising (i.e., entertainment) content assets. The decisions made by an ADS may be straightforward (i.e., specific ad content placed at a specific time in a specific asset) or arbitrarily complex (based on subscriber data, advertising zone, etc.).

A Content Information Service (CIS) may be configured to manage metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) may be a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Ad Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS may be a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Ad Decision Service (ADS) can retrieve and utilize placement opportunity metadata in their advanced advertising decision making.

The Subscriber Information Service (SIS) may be configured to manage per-subscriber information relevant to ad placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 5), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 2:
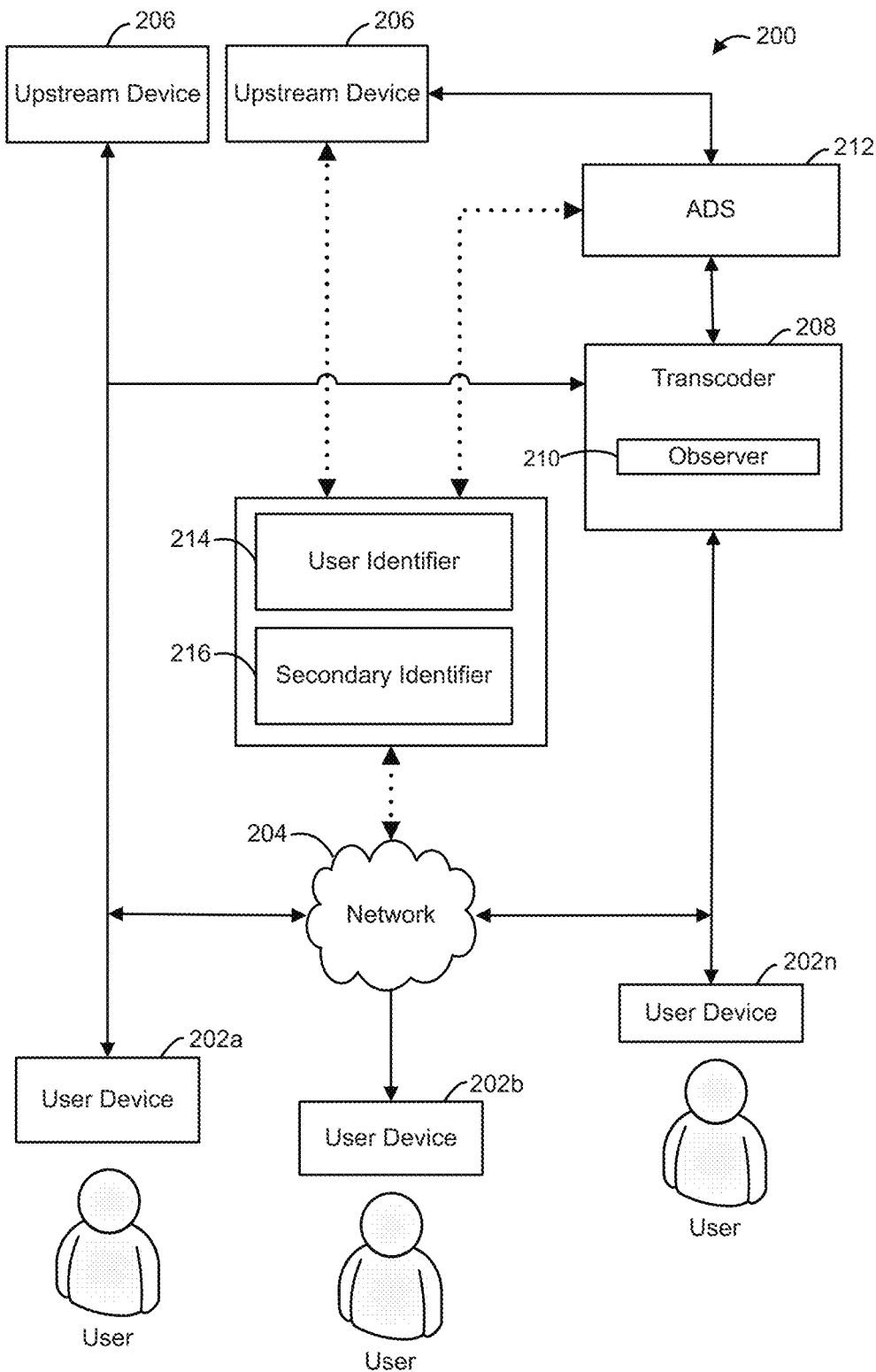
FIG. 2 is a block diagram of an exemplary system.

FIG. 2 is a block diagram of an exemplary content control system 200. The system 200 can comprise one or more upstream devices 202 for accessing and/or transmitting data, such as a data stream. In an aspect, the upstream devices 202 can comprise a content provider (e.g. audio content, video content, data, news feed, sports programming, advertisements, etc.) configured to transmit the data (e.g., as a content assets, stream, fragments, files, etc.) to various end-users. In an aspect, one or more upstream devices 202 can comprise or access an advertisement database having a plurality of advertisements stored therein. As an example, the advertisement database can comprise a plurality of video advertisements. As a further example, the plurality of advertisements can each have a particular time duration associated therewith. In an aspect, the time duration associated with the advertisements or alternate content can be varied in duration for application in various time dependent circumstances. As an example, a particular advertisement can have multiple versions, wherein each version of the same advertisement can have a different time duration. Accordingly, an advertisement having a particular time duration can be retrieved to fill a time slot having a substantially equal time duration. However, any advertisement or advertisements can be retrieved or transmitted to the end user.

The system 200 may be used to select and assemble both the advertisement 212 and the content together and may deliver the combined result to user devices 202a-202n (e.g., set-top box, Internet ready televisions, radios, smartphones, tablets, PCs, etc.). The user devices 202a-202n, may be configured to receive content from various sources including, but not limited to, VOD and/or Internet streaming services, over WiFi or other wireless, or wired connection. Content may be transmitted (e.g., streamed) to the user device 202a-202n via a network such as a content delivery network (CDN) 204.

In certain aspects, a content provider (e.g., MSO, streaming service, etc.) may wish to provide video streams to the user devices 202a-202n. However, certain video may need to be formatted for transmission and/or processing for rendering. Various content creators/players may have incompatible formats. To overcome this problem, a signal received from an upstream devices 206 may be transmitted to a transcoder 208 to place the signal in a desired format and to fragment the formatted signal into the predetermined (e.g., 2 second, 10 second, etc.) chunks of data. These chunks may be stored for subsequent retrieval and transmission.

The system 200 may be or include a network system, such as a closed or managed system, whereby certain components, functions, and/or information are limited to one or more particular entities (e.g., MSO). As an example, the system 200 may be a network system of devices managed or operated by an entity, and the network system may communicate with one or more upstream devices 206 that are associated with entities outside of the network system. For example, the upstream devices 206 may be or comprise devices associated with content inventory, such a repositories of content, advertisers, and/or entities configured to provide content to the managed system without having operative control over the network system. As such, selective information may be communicated to the upstream devices 206 to facilitate certain services or functions such as advertisement placement, as discussed in further detail below.

A network system such as at least a portion of the system 200 may generate an advertisement (ad) inventory event via the consumption of an item of content. The ad inventory event may indicate a position or break in the content where an advertisement may be provided as part of the consumption of the content item. The advertisement inventory event may be filled with an advertisement from one or more sources. The content item may be or comprise audio, video, text or other information. As an example, to identify a particular channel data stream, including times when a program has ended and before the next program begins, or when there is a break in the program, e.g., a placement opportunity, a signal or marker, such as a q-tone, may be inserted in the digital stream a predetermined time before the next program begins, for example. An observer 210, which may be the transcoder 208, informs an ad service (ADS) 212 of the arrival of the signal or marker for subsequent placement of one or more advertisements into the channel data stream.

In managing the delivery of content, the network system may leverage a user identifier 214 that maps to a household, user, or segment of audience consuming the content item. The system and methods of the present disclosure may generate and/or maintain a mapping of a persistent user identifier 214 and a perishable secondary identifier 216 (e.g., session identifier). The persistent user identifier 214 may be a long-lasting identifier associated with a user or user account over multiple sessions or interactions. The secondary identifier 216 may persist at the session level or some other configurable duration of time, or may be associated with a fixed time-to-live (TTL). As an example, when an advertisement rights management platform (e.g., ADS 212) routes advertisement decision rights to an external entity (e.g., upstream device 206) from the network system, the advertisement rights management platform may pass along the perishable secondary identifier 216 to that upstream device 206 while passing both the perishable secondary identifier 216 and the primary persistent user identifier 214 to the instance of the rights management platform of the network system owner.

The use of two identifiers in this manner enables the upstream device 206 that has been granted the rights to see and use the perishable secondary identifier 216 to target advertising to attributes associated with the persistent user identifier 214 without ever having possession of that persistent user identifier 214 nor being able to reverse engineer or impute those targeting attributes to a proxy persistent user identifier 214. As such, the persistent user identifier 214 is maintained by the system and is not exposed to entities interacting with the content items or advertisement inventory events.

Figure 3:
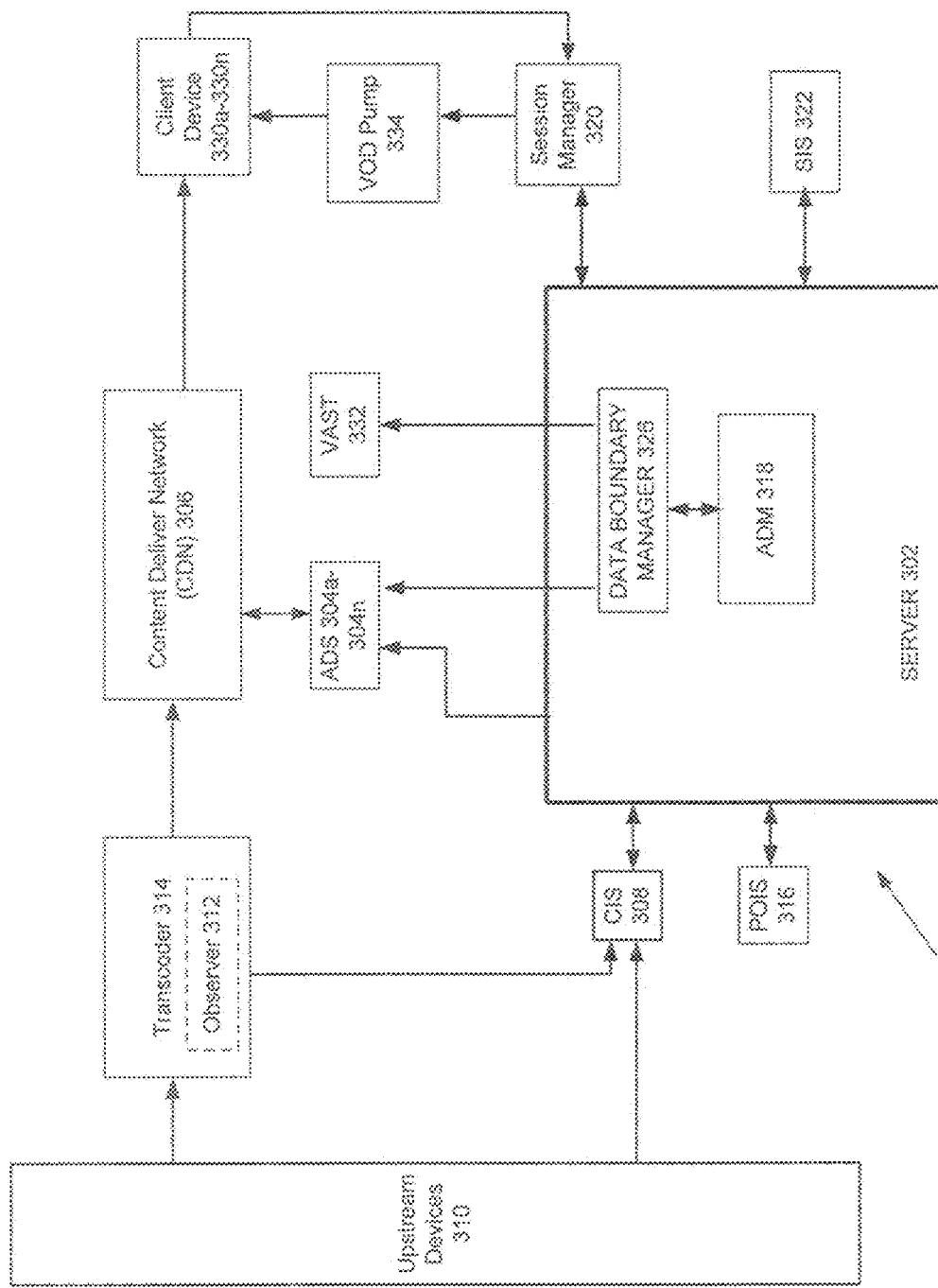
FIG. 3 is a block diagram of an exemplary system.

FIG. 3 depicts a configuration of a system 300 for managing audience data for advertisement placements in network signal streams, according to an embodiment of the present invention. The system 300 may be executed on a server 302, interconnected by one or more networks (not shown) communicatively connected to ad services (ADSs) 304a-304n. The ADSs 304a-304n may be configured to place advertisements into breaks in a data at the request of a CDN 306.

The server 302 may be configured to communicate with a CIS 308 for receiving one or more source signal streams (e.g., digital video, audio, etc.) from upstream devices 310 and corresponding q-tones (e.g., instances of SCTE-35 packets) from one or more observers 312, which may be incorporated within a transcoder 314. The transcoder 314 may also be configured to deliver IP video, audio, etc., in predetermined "chunks" to the CDN 306 as described above.

The CIS 308 may be configured to extract metadata from the one or more source signal streams and from these pre-allocate a corresponding number of unconfirmed placement opportunities without signals and to bind the source signal stream to a plurality of premade, but unconfirmed placement opportunities. Part of the extracted metadata includes a channel identifier associated with a corresponding source signal stream.

A POIS 316 may be configured to "confirm" unconfirmed placement opportunities by identifying temporal starting locations of the unconfirmed placement opportunities relative to both the content stream and a wall clock. The POIS 316 may be configured to return a globally unique value, a UUID, referred to as a signal identifier or signal ID that uniquely identifies a PO as a confirmed PO and its starting location within the end-to-end operational system 300. The POIS 316 then inserts the signal ID and the channel identifier into other extracted metadata of the source signal stream using the appropriate in-band carriage format.

The server 302 may comprise an ADM 318. The ADM 318 may be configured to identify an owner or operator of a signal stream (a network or local/regional channel) having the channel identifier and at least one audience attribute (PII or local/regional market information). To identify the owner of the signal stream and the at least one audience attribute, the ADM 318 may place a call to an external session manager 320.

A user identifier may be used by the ADM 318 to track and manage audience data. As an example, the ADM 318 may transmit the channel identifier to the session manager 320, which provides the ADM 318 with a list of one or more user identifiers indicative of a number of recipients currently viewing an identified channel owned either by a national network or a local or regional entity. The ADM 318 may transmit the list of user identifiers and the channel identifier to the SIS 322, which provides the ADM 318 with a list of sets of audience qualifiers correlated to the user identifiers and the channel identifier. This list of sets of audience qualifiers correlated to the user identifiers and the channel identifier is representative of a list of recipient signal streams having the same channel identifier that are currently being "watched" by subscribers, where each subscriber in the list has a certain set of audience attributes (e.g., PII such as a hardware MAC address, a name, a post office address, a subscription or an order history, and a credit score). The audience attributes may also be indicative of information concerning a market associated with a regional or local service provider (e.g., all males 21 and over in a town or region). The user identifiers may be persistent identifiers. The user identifiers may also be mapped to second identifiers (e.g., temporary identifiers or perishable identifiers) that may be provided to certain entities.

The ADM 318 may be configured to obtain a plurality of targeted advertisements corresponding to the list sets of audience qualifiers correlated to the user identifiers and the channel identifier from the one or more ADSs 304a-304n. As an example, a perishable second identifier may be mapped (e.g., correlated) to the user identifier and may be shared with entities for targeted advertising placement. For example, in managing the delivery of content, a network system may leverage a user identifier that maps to a household, user, or segment of audience consuming the content item. The system and methods of the present disclosure may generate and/or maintain a mapping of the persistent user identifier and a perishable secondary identifier (e.g., session identifier). The secondary identifier may persist at the session level or some other configurable duration of time. As an example, when an advertisement rights management platform (e.g., ADSs 304a-304n, ADM 318, etc.) routes advertisement decision rights to an external entity (e.g., upstream device) from the network system, the advertisement rights management platform may pass along the perishable secondary identifier to that upstream device while passing both the perishable secondary identifier and the primary persistent user identifier to the instance of the rights management platform of the network system owner/operator.

The ADM 318 may receive, from the ADSs 304a-304n for example, the plurality of advertisements targeted to the list representative of the plurality of recipient signal streams.

The ADM 318 may use the signal ID plus a set of locally configured or learned targeting criteria to initiate a unique set of ad decision requests. The ad decision requests evolve into targeted ad decision requests to the appropriate decision owners and the results are a set of ad placement decisions correlating to the placement opportunities generated as a result of signal confirmation.

The ADM 318 may be configured to forward the obtained list of targeted advertisements to the one or more ADSs 304a-304n with PII or local/regional marketing information at least partially removed by an intervening data boundary manager 326 according to a set of rules programmed into the data boundary manager 326.

The CDN 306, in turn, may insert a predetermined list of one or more ads into corresponding placement opportunities by placing ad calls to the one or more ADSs 304a-304n, the latter providing a list of ad decisions purged of PII or local/regional marketing information for ultimate delivery to the user devices (SD) 330a-330n.

Figure 4:
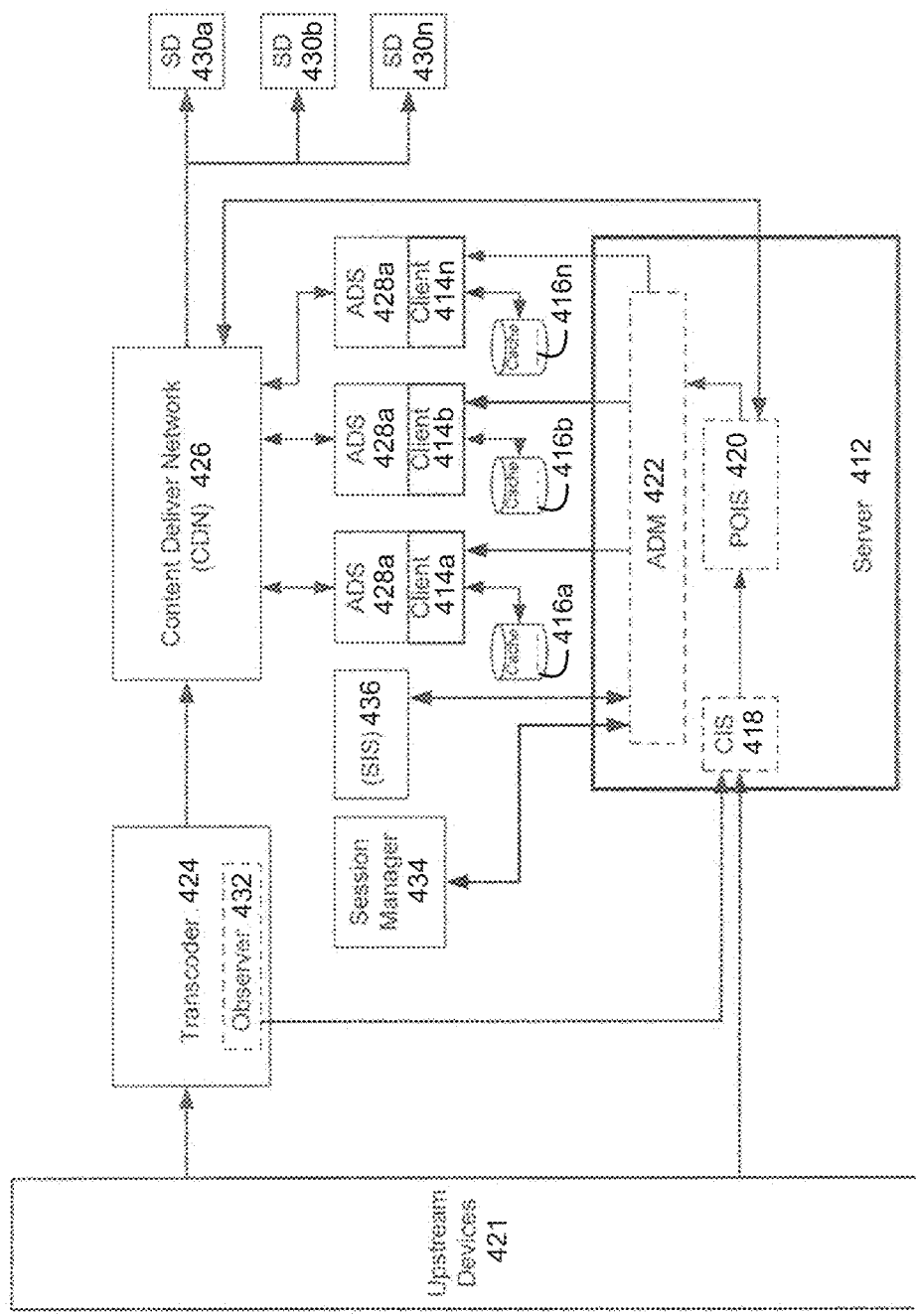
FIG. 4 is a block diagram of an exemplary system.

FIG. 4 depicts a configuration of a system 400 for accelerating advertising placement decisions in signal streams. The system 400 may be executed on a server 412, interconnected by one or more networks (not shown) communicatively connected to client devices 414a-414n. The client devices 414a-414n are configured to store and retrieve a predetermined number of advertisements to/from corresponding caches 416a-416n for delivery to corresponding ADSs 428a-428n under the control of the server 412 and the CDN 426.

The server 412 may be configured to implement a CIS 418 for receiving one or more source signal streams (e.g., digital video, audio, etc.) from upstream devices 421 and corresponding q-tones (i.e., instances of SCTE-35 packets) from one or more observers 434, which may be incorporated within a transcoder 424. The transcoder 424 is also configured to deliver IP video, audio, etc. in predetermined "chunks" to a CDN 426 as described above.

The CIS 418 may be configured configured to extract metadata from the one or more source signal streams and from these pre-allocate a corresponding number of unconfirmed placement opportunities without signals and to bind the source signal stream to a plurality of premade, but unconfirmed placement opportunities. Part of the extracted metadata includes a channel identifier associated with a corresponding source signal stream.

A POIS 420 may be configured to "confirm" unconfirmed placement opportunities by identifying temporal starting locations of the unconfirmed placement opportunities relative to both the content stream and a wall clock. The POIS is configured to return a globally unique value, a UUID, referred to as a signal identifier or signal ID that uniquely identifies a PO as a confirmed PO and its starting location within the end-to-end operational system. The POIS 420 then inserts the signal ID and the channel identifier into other extracted metadata of the source signal stream using the appropriate in-band carriage format.

In parallel, the POIS 420 may be configured to initiate a workflow where by the confirmed signal generates the set of confirmed placement opportunities and fires a lookahead decision trigger with the signal ID as the trigger data. The lookahead decision trigger recipient is an instance of an SCTE 130 Ad Management Service 422, or ADM 422 associated with the server 412. The ADM 422 is configured to identify a list representative of a number of recipient signal streams having the channel identifier and at least one audience attribute prior to expiration of the time period. To identify the list, the ADM 422 places a call each to an external session manager 434 and an SIS 436. The ADM 422 transmits the channel identifier to the session manager 434, which provides the ADM 422 with a list of user identifiers indicative of a number of recipients currently viewing a channel corresponding to the channel identifier. The ADM 422 transmits the list of user identifiers and the channel identifier to the SIS 436 which provides the ADM 422 with a list of sets of audience qualifiers correlated to the user identifiers and the channel identifier. This list of sets of audience qualifiers correlated to the user identifiers and the channel identifier is representative of a list of recipient signal streams having the same channel identifier that are currently being "watched" by subscribers, where each subscriber in the list has a certain set of audience attributes (e.g., all males 21 and over). The user identifiers may be persistent identifiers. The user identifiers may also be mapped to second identifiers (e.g., temporary identifiers or perishable identifiers) that may be provided to certain entities.

The ADM 422 may be configured to obtain a plurality of targeted advertisements corresponding to the list sets of audience qualifiers correlated to the user identifiers and the channel identifier from the one or more ADSs 428a-428n. As an example, a perishable second identifier may be mapped (e.g., correlated) to the user identifier and may be shared with entities for targeted advertising placement. For example, in managing the delivery of content, a network system (e.g., closed or managed by an entity) may leverage a user identifier that maps to a household, user, or segment of audience consuming the content item. The system and methods of the present disclosure may generate and/or maintain a mapping of the persistent user identifier and a perishable secondary identifier (e.g., session identifier). The secondary identifier may persist at the session level or some other configurable duration of time. As an example, when an advertisement rights management platform (e.g., ADSs 428a-428n, ADM 422, etc.) routes advertisement decision rights to an external entity (e.g., upstream device) from the network system, the advertisement rights management platform may pass along the perishable secondary identifier to that upstream device while passing both the perishable secondary identifier and the primary persistent user identifier to the instance of the rights management platform of the network system owner/operator, for example.

The ADM 422 may use the signal ID plus a set of locally configured or learned targeting criteria to initiate a unique set of ad decision requests. The ad decision requests evolve into targeted ad decision requests to the appropriate decision owners and the results are a set of ad placement decisions correlating to the placement opportunities generated as a result of signal confirmation.

The ADM 422 may be configured to store the obtained list of targeted advertisements in one or more caches 428a-428n under the control of corresponding clients 414a-414n associated with corresponding in the one or more ADSs 428a-428n. The ADM 422 associates the unique signal ID with each of the targeted advertisements and stores the targeted advertisements in the one or more caches 428a-428n. Since there may be thousands to millions of ads to be stored in the one or more caches 428a-428n, in an embodiment, the ADM 422 is configured to divide a time interval between reception of a q-tone and the arrival of a corresponding advertisement signal point into a predetermined number of sub-time intervals and divide the signal stream into a predetermined number of sub-signal streams.

The clients 414a-414n may be configured to retrieve predetermined numbers of ads over each of the predetermined number of sub-time intervals for delivery by the ADSs 428a-428n to the predetermined number of sub-signal streams. The CDN 426, in turn, inserts the predetermined number of ads into corresponding placement opportunities of sub-signal streams for ultimate delivery to user devices (SD) 430a-430n over the predetermined number of sub-time intervals. In this way, the tens of thousands to millions of requests for ads do not flood the ADSs 428a-428n substantially simultaneously.

Figure 5:
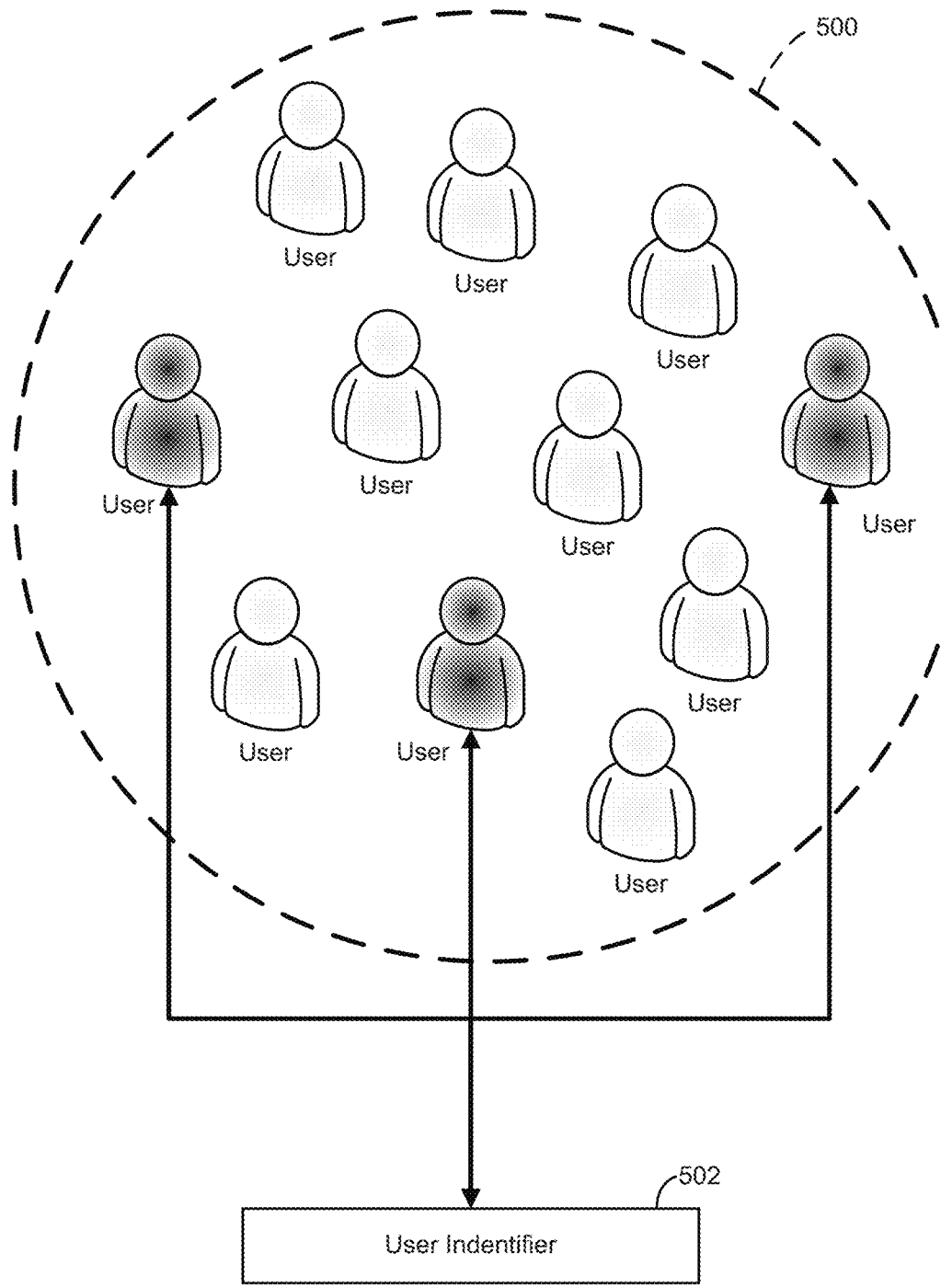
FIG. 5 is a block diagram of an exemplary system.

As discussed in at least FIGS. 2-4, various user identifiers and second identifiers may be used by the system and methods described herein. As an example, FIG. 5 illustrates a group of users 500, which may be or include a region, a market, a subset, a premises, and/or the like. A user identifier 502 may be associated with each individual user or may be associated with the group of users 500 or a subset of the group of users 500.

Figure 6:
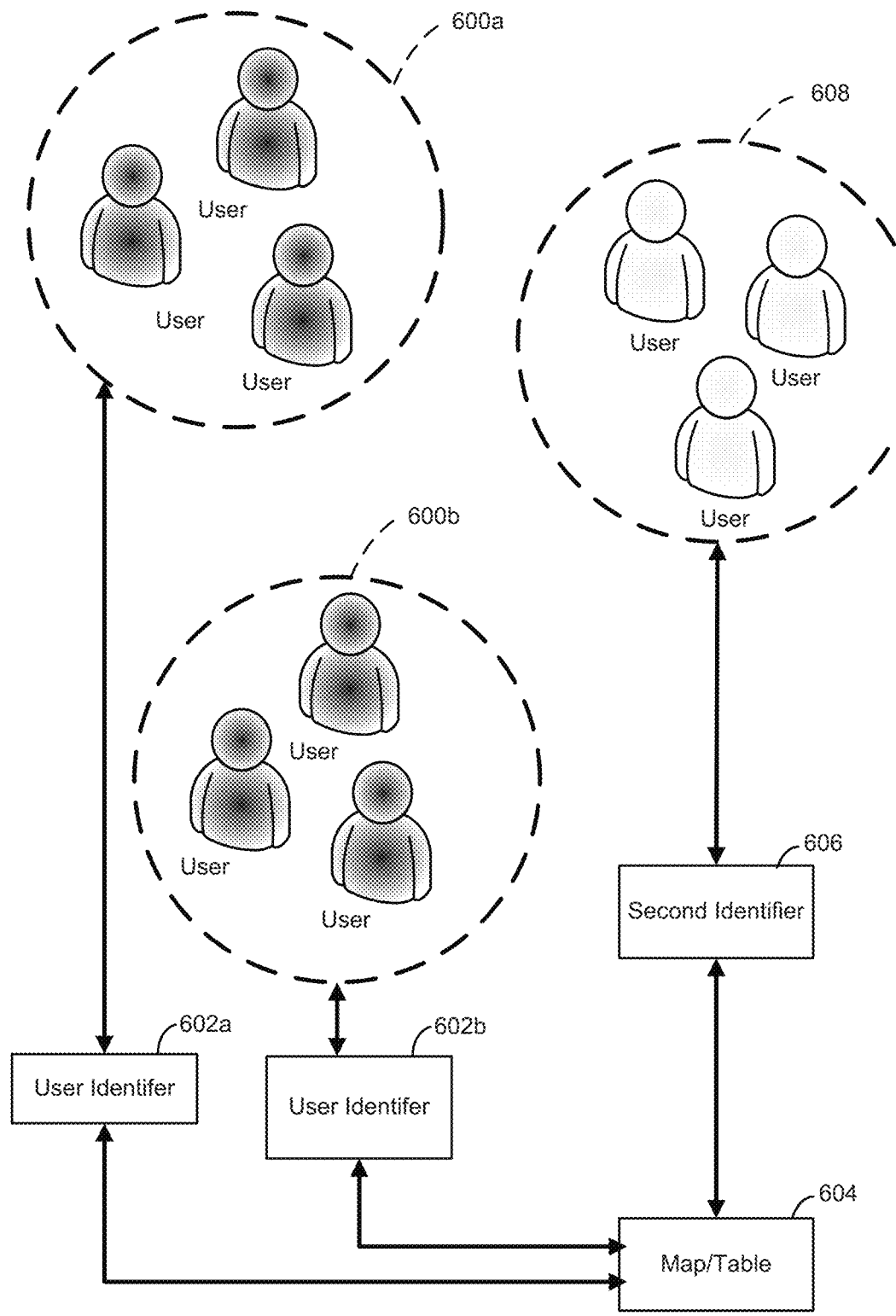
FIG. 6 is a representation of an exemplary network.

As a further example, FIG. 6 illustrates groups of users 600a, 600b which may be or include a region, a market, a subset, a premises, and/or the like. User identifiers 602a, 602b may be associated with each individual user or may be associated with the group of users 600a, 600b or a subset of the group of users 600a, 600b. The user identifiers 602a, 602b may each be correlated with second identifiers 606, for example via a data map or table of values, etc. The second identifiers 606 may be perishable and may expire upon occurrence of event such as a time threshold or termination of a session. As such, the second identifiers 606 may be transmitted to one or more users or entities 608 that may be outside of a close network system.

The use of two identifiers in this manner enables the entities 608 that have been granted the rights to see and use the perishable secondary identifier 606 to target advertising to attributes associated with the persistent user identifiers 602a, 602b without ever having possession of that persistent user identifiers 602a, 602b nor being able to reverse engineer or impute those targeting attributes to a proxy persistent user identifiers 602a, 602b. As such, the persistent user identifiers 602a, 602b is maintained by the system and is not exposed to entities interacting with the content items or advertisement inventory events.

Figure 7:
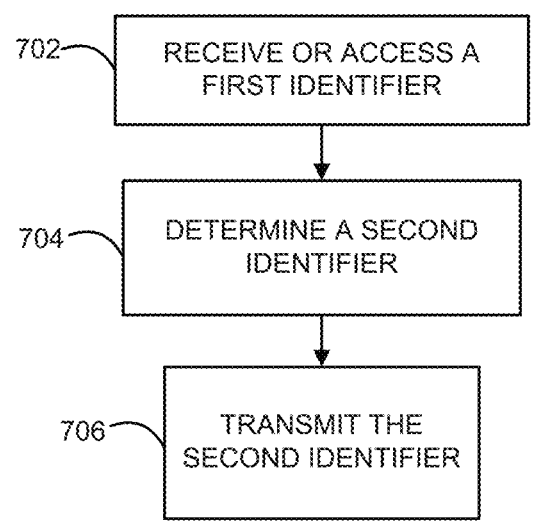
FIG. 7 is a representation of an exemplary network.

FIG. 7 illustrates an exemplary method for content placement. In step 702, a first identifier may be received or accessed. The first identifier may be or comprise a persistent identifier. The first identifier may be associated with one or more users consuming content. The content may comprise one or more advertisement events such as breaks or time intervals.

In step 704, a second identifier may be determined based at least on the first identifier. Determining the second identifier may comprise generating the second identifier. Determining the second identifier may comprise retrieving the second identifier from storage using a mapping key. The second identifier may comprise information relating to the user consuming content that is a subset of the information represented by the first identifier. The second identifier may be or a perishable identifier configured to expire based on an event. The event may be or comprise a time period or termination of a session.

In step 706, the second identifier may be transmitted to an entity associated with an advertisement inventory. The second identifier may facilitate the targeted placement of one or more advertisement from the advertisement inventory without exposing the first identifier to the entity. The second identifier may be an encrypted one-way hash based on at least the first identifier. As an example, a plurality (e.g., series) of perishable second identifiers may be hashed from the persistent first identifier to control the information that is represented by (or indicated by) the second identifier.

As an illustrative example, the use of the second perishable identifier may facilitate tracking of viewing behavior of particular users/clients by entities outside the system of a service provider (e.g., content provider, MSO, etc.) without exposing the first identifier to the outside entity. As such, the second identifier may be associated with or may indicate a select amount of information that is being shared with the outside entity. Accordingly, the outside entity may process the second identifier to target advertisements or to make other decisions based on the user information, but without having full access to all of the user information that is available to a provider of the second identifier. As a further example, the first identifier may be associated with a user profile comprising the location of a device including its hardware MAC address, marketing information, such as which programs and commercials have been viewed, and direct subscriber personal information such as a subscriber's name, home address, subscription or order history, and credit score. However, the second identifier may be associated with a subset of information for a finite window of time. The subset of information may comprise the location of a device, but may not expose additional information. The type, amount, and timing of availability associated with the shared information may be selectively controlled and may be dependent upon the intended recipient, the timing, the particular user, or other characteristics.

Figure 8:
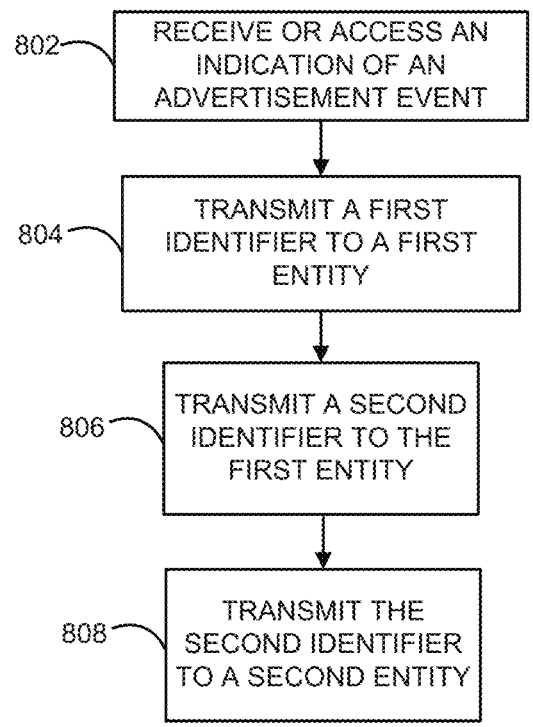
FIG. 8 is a flow chart of an exemplary method.

FIG. 8 illustrates an exemplary method for content placement. In step 802, an indication of an advertisement event associated with content may be accessed or received.

In step 804, a first identifier may be transmitted to a first entity configured to manage delivery of the content. The first identifier may be or comprise a persistent identifier. The first identifier may be associated with one or more users consuming content. The first identifier may identify a user receiving content. The first identifier may be associated with one or more of content viewing behavior of one or more users, a location of one or more users, and a demographic information of one or more users.

In step 806, a second identifier may be transmitted to the first entity. The second identifier may be a perishable identifier configured to expire based on an event. The second identifier may comprise information relating to the user consuming content that is a subset of the information represented by the first identifier. The subset of information may be associated with one or more of content viewing behavior of one or more users, a location of one or more users, and a demographic information of one or more users. The second identifier may be or a perishable identifier configured to expire based on an event. The event may be or comprise a time period or termination of a session.

In step 808, the second identifier may be transmitted to a second entity associated with an advertisement inventory. The second identifier may facilitate the targeted placement of one or more advertisement from the advertisement inventory based on the advertisement event without exposing the first identifier to the second entity. As an example, the second entity may be configured to associate the second identifier with the one or more content assets such that the one or more content assets may be delivered to one or more users based on a mapping of the second identifier to the first identifier. The second identifier may be an encrypted one-way hash based on at least the first identifier. As an example, a plurality (e.g., series) of perishable second identifiers may be hashed from the persistent first identifier to control the information that is represented by (or indicated by) the second identifier.

As an illustrative example, the use of the second perishable identifier may facilitate tracking of viewing behavior of particular users/clients by entities outside the system of a service provider (e.g., content provider, MSO, etc.) without exposing the first identifier to the outside entity. As such, the second identifier may be associated with or may indicate a select amount of information that is being shared with the outside entity. Such selection may be made based on rules or factors relating to the user, the recipient of the identifiers, the content, the content provider, and the like. Accordingly, the outside entity may process the second identifier to target content delivery or to make other decisions based on the user information, but without having full access to all of the user information that is available to a provider of the second identifier. As a further example, the first identifier may be associated with a user profile comprising the location of a device including its hardware MAC address, marketing information, such as which programs and commercials have been viewed, and direct subscriber personal information such as a subscriber's name, home address, subscription or order history, and credit score. However, the second identifier may be associated with a subset of information for a finite window of time. The subset of information may comprise the location of a device and may be available for predetermined period of time (e.g., 1 hour), but may not expose additional information. The type, amount, and timing of availability associated with the shared information may be selectively controlled and may be dependent upon the intended recipient, the timing, the particular user, or other characteristics.

Figure 9:
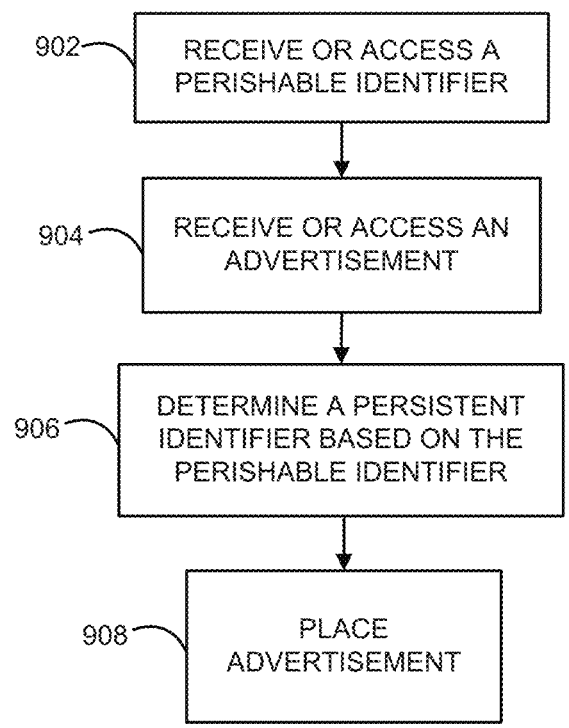
FIG. 9 is a flow chart of an exemplary method.

FIG. 9 illustrates an exemplary method for content placement. In step 902, a perishable identifier may be received or accessed. The perishable identifier may be associated with one or more users consuming content. The content may comprise one or more advertisement events such as a breaks or intervals. The perishable identifier may be configured to expire based on one or more of a time period and termination of a session.

In step 904, an advertisement may be received or accessed based at least on the one or more advertisement events. As an example, one or more advertisements may be received to be placed at the one or more advertisement events.

In step 906, a persistent identifier may be determined based at least on the perishable identifier. The persistent identifier may be associated with the one or more users consuming content. Determining the persistent identifier may comprise retrieving the persistent identifier from storage using a mapping key associated with the perishable identifier.

In step 908, one or more advertisements may be placed, for example, using one or more of the perishable identifier and the persistent identifier. Placing the advertisement may comprise causing the advertisement to be rendered to the user consuming content. The perishable identifier may facilitate the targeted placement of the advertisement without exposing the persistent identifier to a source of the advertisement. Although advertisements are described, any placement of content may be effected based on one or more of the identifiers. Supplemental content may be placed in addition to a primary content that is being consumed. Alternative content may be placed. The term advertisement is used as an example only and is not intended to limit the scope of the use of the first and/or second identifiers in managing content selection and delivery.

Figure 10:
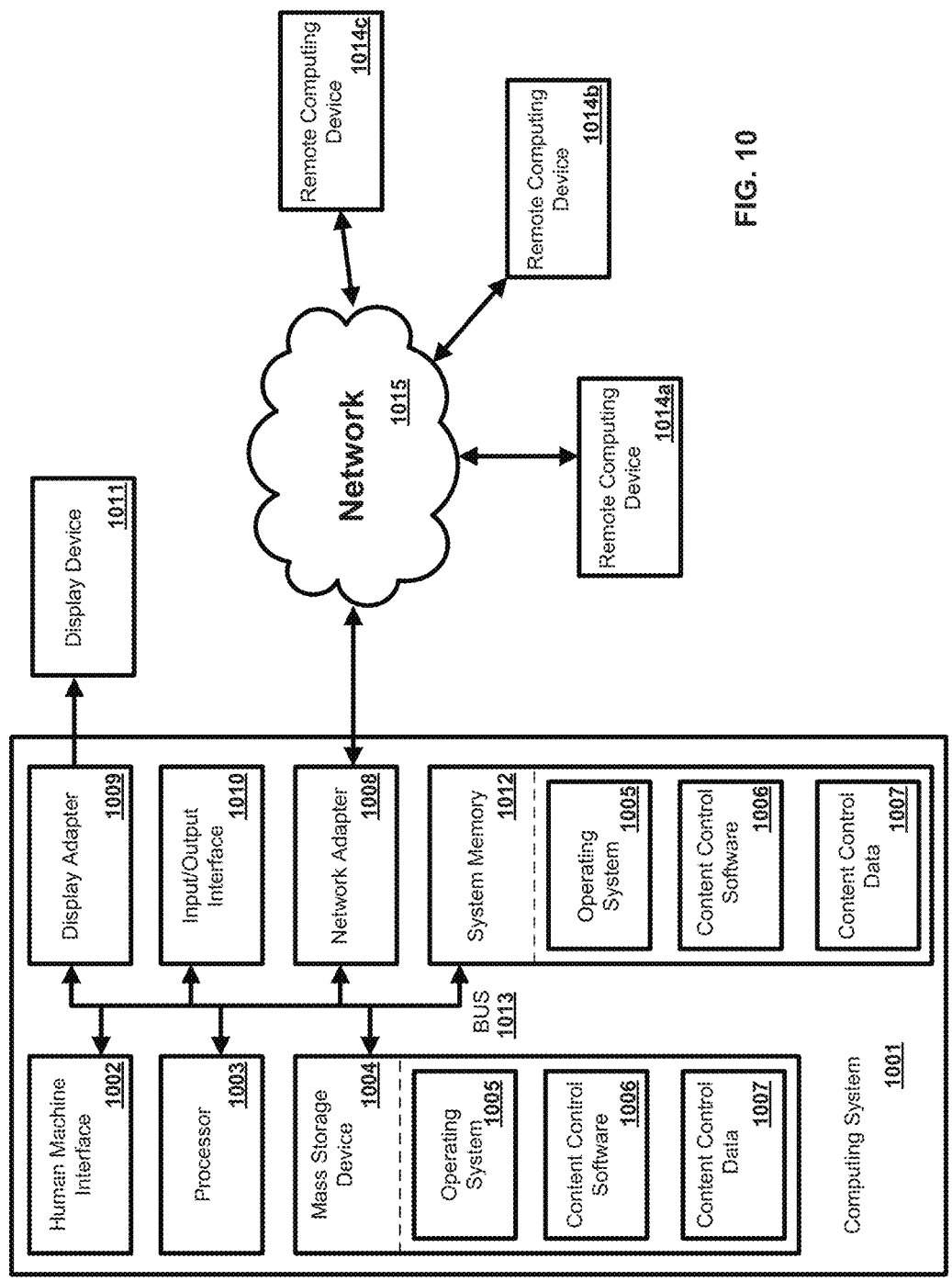

FIG. 10 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 1001. The components of the computing system 1001 can comprise, but are not limited to, one or more processors or processing units 1003, a system memory 1012, and a system bus 1013 that couples various system components including the processor 1003 to the system memory 1012. In the case of multiple processing units 1003, the system can utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description can also be implemented over a wired or wireless network connection and each of the subsystems, including the processor 1003, a mass storage device 1004, an operating system 1005, content control software 1006, content control data 10010, a network adapter 1008, system memory 1012, an Input/Output Interface 1010, a display adapter 1009, a display device 1011, and a human machine interface 1002, can be contained within one or more remote computing devices 1014*a,b,c* at physically separate locations, connected through buses of this form, in effect implementing a fully distributed system.

The computing system 1001 typically comprises a variety of computer readable media. Exemplary readable media can be any available media that is accessible by the computing system 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as content control data 1007 and/or program modules such as operating system 1005 and content control software 1006 that are immediately accessible to and/or are presently operated on by the processing unit 1003.

In another aspect, the computing system 1001 can also comprise other removable/non-removable, volatile/non-volatile computer storage media. By way of example, FIG. 10 illustrates a mass storage device 1004 which can provide non-volatile storage of computer code, computer readable instructions, data structures, program modules, and other data for the computing system 1001. For example and not meant to be limiting, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, an operating system 1005 and content control software 1006. Each of the operating system 1005 and content control software 1006 (or some combination thereof) can comprise elements of the programming and the content control software 1006. Content control data 1007 can also be stored on the mass storage device 1004. Content control data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 1007 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1003 via a human machine interface 1002 that is coupled to the system bus 1013, but can be connected by other interface and bus structures, such as a parallel port, game port, an IEEE 1394 Port (also known as a Firewire port), a serial port, or a universal serial bus (USB).

In yet another aspect, a display device 1011 can also be connected to the system bus 1013 via an interface, such as a display adapter 1009. It is contemplated that the computing system 1001 can have more than one display adapter 1009 and the computing system 1001 can have more than one display device 1011. For example, a display device can be a monitor, an LCD (Liquid Crystal Display), or a projector. In addition to the display device 1011, other output peripheral devices can comprise components such as speakers (not shown) and a printer (not shown) which can be connected to the computing system 1001 via Input/Output Interface 1010. Any step and/or result of the methods can be output in any form to an output device. Such output can be any form of visual representation, including, but not limited to, textual, graphical, animation, audio, tactile, and the like. The display 1011 and computing system 1001 can be part of one device, or separate devices.

The computing system 1001 can operate in a networked environment using logical connections to one or more remote computing devices 1014*a,b,c*. By way of example, a remote computing device can be a personal computer, portable computer, smartphone, a server, a router, a network computer, a peer device or other common network node, and so on. Logical connections between the computing system 1001 and a remote computing device 1014*a,b,c* can be made via a network 1015, such as a local area network (LAN) and/or a general wide area network (WAN). Such network connections can be through a network adapter 1008. A network adapter 1008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are illustrated herein as discrete blocks, although it is recognized that such programs and components reside at various times in different storage components of the computing system 1001, and are executed by the data processor(s) of the computer. An implementation of content control software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving a first identifier associated with a user of content, wherein the content comprises one or more advertisement events;
determining a second identifier by retrieving the second identifier based on a mapping between the second identifier and the first identifier, wherein the second identifier is a perishable identifier configured to expire based on an event;
transmitting the second identifier to an external entity, wherein, if the second identifier is not expired at the external entity, the external entity is provided access to use the second identifier to determine a targeted placement of an advertisement that maps to one or more attributes associated with the first identifier without exposing the first identifier to the external entity, and
wherein, if the second identifier is expired at the external entity before determination of the targeted placement of the advertisement, the external entity is not provided access to use the second identifier to determine the targeted placement of the advertisement; and
placing a received advertisement at the one or more advertisement events in the content.

2. The method of claim 1, wherein the event comprises a time period.

3. The method of claim 1, wherein the event comprises termination of a session.

4. The method of claim 1, wherein the second identifier indicates a subset of information associated with the first identifier prior to occurrence of an event, wherein the subset of the information comprises one or more of: content viewing behavior of one or more users, a location of one or more users, and a demographic information of one or more users.

5. The method of claim 1, wherein the first identifier is a persistent identifier.

6. The method of claim 1, wherein the first identifier is associated with a plurality of users.

7. The method of claim 1, further comprising receiving, from the external entity, the advertisement based on the second identifier not expiring at the external entity at least at a time of a determination of the targeted placement of the advertisement.

8. The method of claim 1, wherein the second identifier is retrieved via a data map using a mapping key indicating the mapping between the second identifier and the first identifier.

9. A method comprising:
receiving an indication of an advertisement opportunity associated with content;
transmitting a first identifier to at least one of one or more first devices associated with a rights management entity;
transmitting a second identifier to the at least one of the one or more first devices associated with the rights management entity, wherein the second identifier is a perishable identifier configured to expire based on an event, and wherein the second identifier is determined by retrieving the second identifier based on a mapping between the second identifier and the first identifier; and
transmitting the second identifier to a second device associated with an external entity,
wherein, if the second identifier is not expired at the external entity, the external entity is provided access to use the second identifier to determine targeted placement of one or more content assets that maps to one or more attributes associated with the first identifier based on the advertisement opportunity without exposing the first identifier to the external entity, and
wherein, if the second identifier is expired at the external entity before determination of the targeted placement of the one or more content assets, the external entity is not provided access to use the second identifier to determine the targeted placement of the one or more content assets.

10. The method of claim 9, wherein the event comprises a time period.

11. The method of claim 10, wherein the event comprises termination of a session.

12. The method of claim 9, wherein the second identifier indicates a subset of information associated with the first identifier prior to occurrence of an event, wherein the subset of the information comprises one or more of: content viewing behavior of one or more users, a location of one or more users, and a demographic information of one or more users.

13. The method of claim 12, wherein the second identifier causes the subset of information associated with the first identifier not to be available to the external entity when the second identifier expires upon occurrence of an event.

14. The method of claim 9, wherein the first identifier is a persistent identifier.

15. The method of claim 9, further comprising
sending, if the second identifier is not expired at least at a time of the transmitting, to a user device associated with the first identifier, the one or more content assets placed in the advertisement opportunity of the content.

16. A device comprising:
one or more processors; and
memory storing instructions that, when executed by the one or more processors, cause the device to:
 receive a first identifier associated with a user of content, wherein the content comprises one or more advertisement events;
 determine a second identifier by retrieving the second identifier based on a mapping between the second identifier and the first identifier, wherein the second identifier is a perishable identifier configured to expire based on an event;
 transmit the second identifier to an external entity,
 wherein, if the second identifier is not expired at the external entity, the external entity is provided access to use the second identifier to determine a targeted placement of an advertisement that maps to one or more attributes associated with the first identifier without exposing the first identifier to the external entity, and
 wherein, if the second identifier is expired at the external entity before determination of the targeted placement of the advertisement, the external entity is not provided access to use the second identifier to determine the targeted placement of the advertisement; and
 place a received advertisement at the one or more advertisement events in the content.

17. The device of claim 16, wherein the event comprises a time period.

18. The device of claim 16, wherein the event comprises termination of a session.

19. The device of claim 16, wherein the second identifier indicates a subset of information associated with the first identifier prior to occurrence of an event, wherein the subset of the information comprises one or more of: content viewing behavior of one or more users, a location of one or more users, and a demographic information of one or more users.

20. The device of claim 16, wherein the first identifier is a persistent identifier.

21. The device of claim 16, wherein the instructions, when executed by the one or more processors, further cause the device to:
 send, if the second identifier is not expired at least at a time of the transmitting, to a user device associated with the first identifier, the received advertisement placed in the one or more advertisement events of the content.

* * * * *